UNITED STATES PATENT OFFICE.

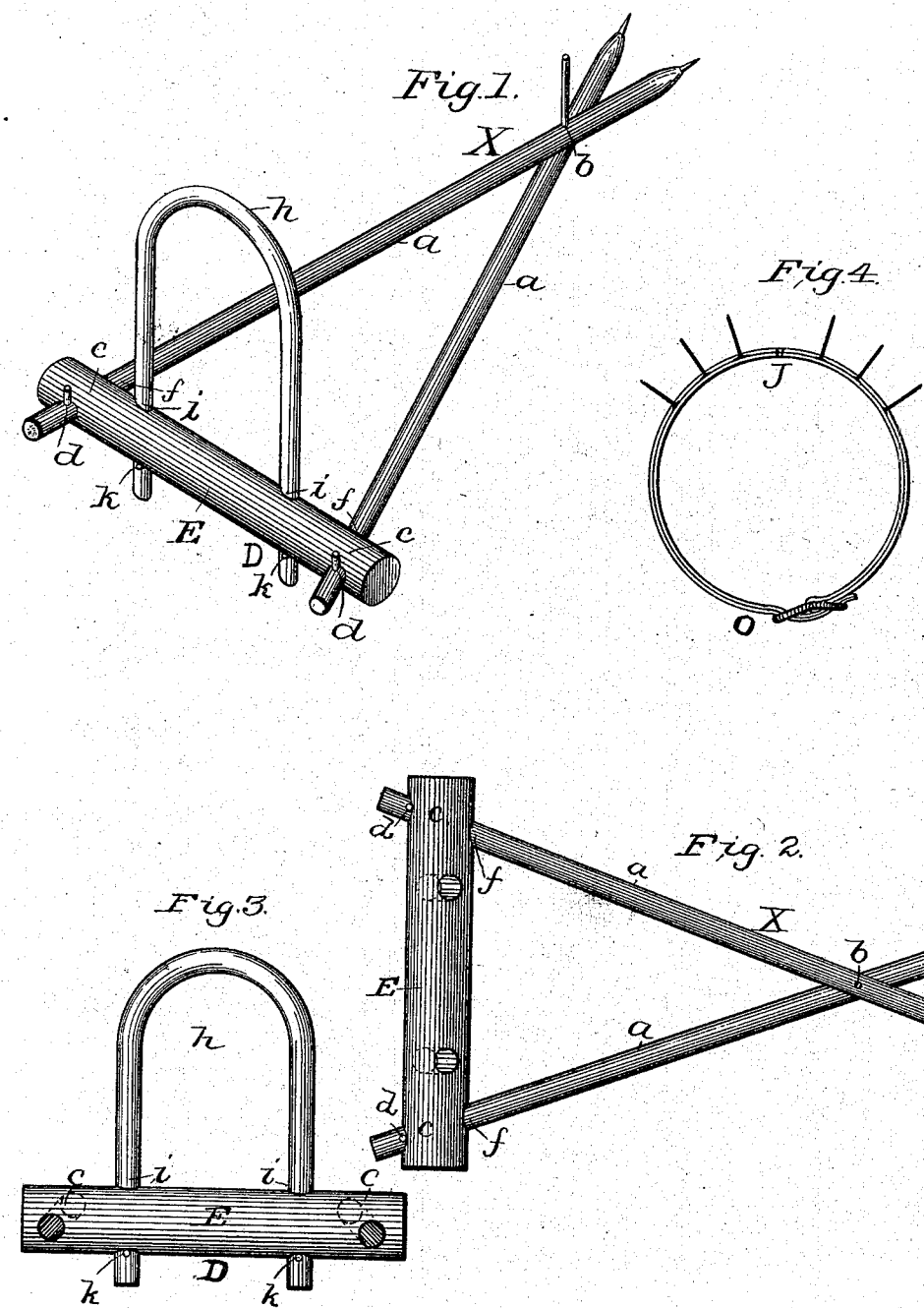

BURWELL W. BUSSELL, OF WALLA WALLA, WASHINGTON.

CALF-WEANER.

SPECIFICATION forming part of Letters Patent No. 552,685, dated January 7, 1896.

Application filed March 20, 1893. Renewed October 11, 1894. Serial No. 525,649. (No model.)

*To all whom it may concern:*

Be it known that I, BURWELL W. BUSSELL, a citizen of the United States, residing at Walla Walla, in the county of Walla Walla, in the State of Washington, have invented and produced a new and useful Improvement in Calf-Weaners, of which the following is a specification, reference being had to the accompanying drawings, showing a part thereof.

Figure 1 is a perspective view of my improved calf-weaner, showing my improvement. Fig. 2 shows appearance of device after removal of bow which passes over neck of calf. Fig. 3 shows bow and brisket-piece disconnected from other parts of instrument. Fig. 4 shows leather muzzle-piece armed with sharp spikes.

Similar letters refer to similar parts throughout the several views.

The two bars *a a*, twenty-two inches long, one and one-fourth inches in diameter, armed at point with small sharp spike or brad, cross each other six inches from end, being dovetailed together and held by bolt or rivet *b*. The long ends of the bars pass through brisket-piece at *c c*, and fastened by keys *d d* at an angle of twenty degrees.

Brisket-piece E, Figs. 1, 2 and 3, is a beam of wood eighteen inches long by three inches in diameter, with holes one inch in diameter and two inches from either end for reception of bars which are fastened by keys *d d*.

The bow *h* is a wooden bow made so as to pass over the neck and through holes in brisket-piece at *i i*, and fastened by keys *k k*, holes in brisket-piece being eight inches apart.

The muzzle-piece *j* is a leather strap two inches wide with six sharp spikes passing through it extending upward, with a second piece sewed on inside to hold spikes in place. The center of this strap passes over rivet *b* at crossing of bars *a a*, Fig. 1, which extends upward about three inches so as to form spike, and is fastened beneath chin by buckle.

The object of my invention is to furnish a cheap, safe, and perfectly reliable instrument to prevent the calf from sucking while running with the dam, and at the same time allow the calf perfect freedom in eating and grazing, and also be safe from any injury by means of its use.

What I claim as my invention, and what I desire by Letters Patent, is—

1. In an animal poke, the combination of the cross-bar, the stale composed of two rods secured thereto at an angle so as to make the rods overlap near their outer ends and fastened together by means of a dovetail and a pin, barbs secured to the outer ends of the rods, and means for securing the device to an animal as set forth.

2. In an animal poke, the combination of the bow a cross-bar having holes therein near each end through which the ends of the bow pass, pins passing through said bow, on each side of the cross-bar, the stale composed of two rods secured to the cross-bar at an angle so as to make the rods overlap near their outer ends, a pin secured to the rods at their point of juncture, and a leather strap provided with barbs, at its upper side and having an aperture therein for its insertion over said pin, and fastening means on its under side, so that it can be secured to the animal as set forth.

B. W. BUSSELL.

Witnesses:
P. B. HAWLEY,
F. A. COLT.